(12) United States Patent
Edpalm et al.

(10) Patent No.: US 11,146,817 B2
(45) Date of Patent: Oct. 12, 2021

(54) METHOD, DEVICE AND COMPUTER PROGRAM PRODUCT FOR ENCODING A DISTORTED IMAGE FRAME

(71) Applicant: Axis AB, Lund (SE)

(72) Inventors: Viktor Edpalm, Lund (SE); Song Yuan, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 16/807,208

(22) Filed: Mar. 3, 2020

(65) Prior Publication Data
US 2020/0366934 A1    Nov. 19, 2020

(51) Int. Cl.
*H04N 19/597* (2014.01)
*H04N 19/176* (2014.01)
*H04N 19/12* (2014.01)
*H04N 19/182* (2014.01)
*H04N 19/154* (2014.01)

(52) U.S. Cl.
CPC ........... *H04N 19/597* (2014.11); *H04N 19/12* (2014.11); *H04N 19/154* (2014.11); *H04N 19/176* (2014.11); *H04N 19/182* (2014.11)

(58) Field of Classification Search
CPC ... H04N 19/154; H04N 19/174; H04N 19/119
See application file for complete search history.

(56) References Cited

U.S. PATENT DOCUMENTS

| | | | |
|---|---|---|---|
| 2014/0254659 A1 | 9/2014 | Ho et al. | |
| 2015/0319456 A1* | 11/2015 | Le Floch | H04N 19/119 375/240.12 |
| 2016/0140421 A1* | 5/2016 | Edpalm | H04N 19/172 382/220 |
| 2016/0309065 A1* | 10/2016 | Karafin | G03B 35/10 |

(Continued)

FOREIGN PATENT DOCUMENTS

EP    3301920 A1    4/2018

OTHER PUBLICATIONS

"Nested Polygonal Chain Mapping of Omnidirectional Video"—Kashyap Kammachi-Sreedhar, Miska M. Hannuksela; 978-1-5090-2175-8/17/$31.00 (c) 2017 IEEE (Year: 2017).*

(Continued)

*Primary Examiner* — Mainul Hasan
(74) *Attorney, Agent, or Firm* — Xsensus LLP (57) ABSTRACT

A method for encoding, using a block-based video encoding algorithm, a distorted image frame produced via at least one image sensor, comprising: determining a map of maximum pixel block sizes corresponding to the distorted image frame, wherein the map of maximum pixel block sizes is determined based on a spatial resolution distribution corresponding to a distribution of extents of the corresponding FOV, such that for a first portion of the distorted image frame having a first spatial resolution, the maximum pixel block size corresponding to the first portion is set to a first value, and for a second portion of the distorted image frame having a second spatial resolution being lower than the first (Continued)

spatial resolution, the maximum pixel block size corresponding to the second portion is set to a second value being lower than the first value; and encoding, using the block-based video encoding algorithm, the distorted image frame.

14 Claims, 5 Drawing Sheets

(56) References Cited

U.S. PATENT DOCUMENTS

| | | | |
|---|---|---|---|
| 2017/0251204 A1* | 8/2017 | Gupte | H04N 19/154 |
| 2017/0316549 A1* | 11/2017 | Dunn | H04L 67/18 |
| 2017/0336705 A1* | 11/2017 | Zhou | G06T 3/0062 |
| 2018/0103199 A1* | 4/2018 | Hendry | H04N 21/21805 |
| 2018/0164593 A1* | 6/2018 | Van Der Auwera | H04N 21/816 |
| 2018/0184112 A1 | 6/2018 | Yamori | |
| 2018/0249163 A1* | 8/2018 | Curcio | H04N 19/115 |
| 2018/0278936 A1 | 9/2018 | Hendry et al. | |
| 2018/0367802 A1 | 12/2018 | Han et al. | |
| 2019/0215532 A1* | 7/2019 | He | H04N 13/117 |
| 2019/0238888 A1* | 8/2019 | Kim | H04N 19/70 |
| 2019/0313097 A1* | 10/2019 | Urban | H04N 19/176 |
| 2019/0364261 A1* | 11/2019 | Hwang | H04N 21/4728 |
| 2020/0177916 A1* | 6/2020 | Niamut | A01C 3/023 |
| 2020/0267385 A1* | 8/2020 | Lim | H04N 19/70 |
| 2020/0275116 A1* | 8/2020 | Bang | H04N 19/57 |

OTHER PUBLICATIONS

"Multi-View Coding for Image-Based Rendering Using 3-D Scene Geometry"—Marcus Magnor, Prashant Ramanathan, Bernd Girod; IEEE Transactions on Circuits and Systems for Video Technology, vol. 13, No. 11, Nov. 2003 (Year: 2003).*

"Optimized Video Coding for Omnidirectional Videos"—Minhao Tang, Yu Zhang, Jiangtao Wen, Shiqiang Yang; Proceedings of the IEEE International Conference on Multimedia and Expo (ICME) 2017 (Year: 2017).*

"Spherical Domain Rate-Distortion Optimization for Omnidirectional Video Coding"—Yiming Li, Jizheng Xu, Zhenzhong Chen; IEEE Transactions on Circuits and Systems for Video Technology, vol. 29, No. 6, Jun. 2019 (Year: 2019).*

"Nested Polygonal Chain Mapping of Omnidirectional Video"—Kashyap Kammachi-Sreedhar, Miska M. Hannuksela; 978-I-5090-2175-8/17/$31.00 (c) 2017 IEEE (Year: 2017).*

Scaramuzza, D., "Omnidirectional Camera," 2014, 14 pages.

Xu, M., et al., "Region-of-Interest Based Conversational HEVC Coding with Hierarchical Perception Model of Face," IEEE Journal of Selected Topics in Signal Processing, vol. 8, No. 3, Jun. 2014, pp. 475-489.

Yu, M., et al., "A Framework to Evaluate Omnidirectional Video Coding Schemes," 2015 IEEE International Symposium on Mixed and Augmented Reality, IEEE, Sep. 2015, pp. 31-36.

* cited by examiner

METHOD, DEVICE AND COMPUTER PROGRAM PRODUCT FOR ENCODING A DISTORTED IMAGE FRAME

CROSS-REFERENCE TO RELATED APPLICATION

The present application claims priority to EP 19174349.1, filed May 14, 2019, the entire contents of which are incorporated herein by reference.

TECHNICAL Field

The present invention relates to encoding, using a block-based video encoding algorithm, distorted image frames produced via at least one image sensor.

BACKGROUND OF THE INVENTION

An important field for camera applications is monitoring of a location. Typically, different camera configurations are used depending on the monitored location. For instance, a parking lot can be monitored using one or more cameras capable of producing wide-angle videos (e.g. by panoramic stitching or using wide-angle lenses) in order to retrieve an aerial overview of the parking lot. In wide-angle videos the size of an objects varies over the frame, which is an effect of the uneven spatial resolution over the video frames. A size of a vehicle moving through the monitored scene will therefore change, as the size depends on the present position in the monitored scene. Videos of the monitored location are typically processed using a wide range of different image-processing algorithms. For instance, the videos are encoded, in order to reduce bandwidth requirements and file sizes associated with the encoded videos.

However, a challenge for video encoding is to provide an adequate visual quality of moving objects in the encoded video due to uneven spatial resolution in the video frame.

SUMMARY OF THE INVENTION

In view of the above, it is an object of the present inventive concept to mitigate, alleviate or eliminate one or more of the above-identified deficiencies and disadvantages in the art singly or in combination.

According to a first aspect a method for encoding, using a block-based video encoding algorithm, distorted image frames produced via at least one image sensor is provided. The method comprises: determining a spatial resolution distribution for the distorted image frames; determining a map of maximum pixel block sizes corresponding to the distorted image frames, wherein the map of maximum pixel block sizes is determined based on the spatial resolution distribution such that for a first portion of the distorted image frames having a first spatial resolution, the maximum pixel block size corresponding to the first portion is set to a first value, and for a second portion of the distorted image frames having a second spatial resolution being lower than the first spatial resolution, the maximum pixel block size corresponding to the second portion is set to a second value being lower than the first value; and encoding, using the block-based video encoding algorithm, the distorted image frames, wherein the map of maximum pixel block sizes is used for defining maximum block sizes for encoding blocks of the block-based video encoding algorithm.

Within the context of this application, "distorted image frame" should be construed as an image frame which has a distorted perspective. In a distorted image frame, straight lines in the scene are typically curved to some degree. In contrast, a perfectly rectilinear image frame has perfectly straight lines corresponding to straight lines in a depicted scene. Within the context of this application, two types of distortion sources are discussed: physical distortion sources and digital distortion sources. Non-limiting examples of physical distortion sources are wide-angle lenses, including fish-eye lenses (e.g. f-theta lenses), optical domes and imperfectly rectilinear lenses. Imperfections in a lens may be caused by manufacturing imprecisions. Non-limiting examples of digital distortion sources are image stitching algorithms, for example for producing a panoramic image from a plurality of images. The distortion pattern can be irregular or regular (such as radial distortions). The distortion pattern of a captured image may be the result from one or a combination of distortion sources.

Within the context of this application, "spatial resolution" should be understood as a spatial resolution for an image frame. In a distorted image frame, acquired through e.g. a wide-angle lens or stitched from multiple image frames, different portions of the image have different spatial resolution. In other words, equally sized portions of the image frame cover differently sized angles of the camera's field of view (FOV). The spatial resolution may be specified on a pixel level for an image frame, or can be determined on a pixel sub-group level, e.g. on a macroblock level. Spatial resolution may be expressed as number of pixels per FOV angle, or as amount of FOV angle per pixel. The skilled person is familiar with how to interchange between these expressions depending on application. For example, in an implementation of a method according to the present inventive concept, one of these expressions may be preferred to use. A spatial resolution distribution may be represented by, e.g., a table indicating the spatial resolution distribution for pixels or pixel sub-groups, e.g. for macroblocks.

Within the context of this application, "block-based video encoding algorithm" should be construed as an algorithm for encoding video in which a set of neighboring pixels in an image frame are processed as an encoding block. The size of the encoding block may vary in between individual frames in a video stream for corresponding portions of pixels of the individual frames of the video stream. The size of different pixel blocks in a frame may vary. Generally, a large size of the encoding blocks results in a lower computational cost associated with encoding, which is why the block-based video encoding algorithm typically is programmed to use as large size as possible of the encoding blocks. On the other hand, a large size of encoding blocks also leads to a reduced visual quality of the encoded video. The block-based video encoding algorithm is therefore programmed to balance the size of the encoding blocks and the visual quality of the encoded video.

Within the context of this application, "encoding block" should be construed as the basic processing unit of the block-based video encoding algorithm. For instance, in case the block-based video encoding algorithm is h.265 or AV1, the encoding block may be a coding unit (CU).

By means of the present inventive concept, the maximum block sizes for encoding blocks of the block-based video encoding algorithm are based on the spatial distribution for the distorted image frames, and thereby an improved visual quality of the encoded video is allowed. Since the spatial resolutions of the first and second portions are different, basing the maximum block sizes for encoding blocks of the block-based encoding algorithm on the spatial resolution, a more homogenous, and therefore improved, visual quality of the encoded video is allowed. Specifically, by setting a lower maximum pixel block size for areas in the distorted image with a lower spatial resolution, details in these areas of the distorted image frame may be better preserved in the encoded image frame.

The block-based video encoding algorithm may be h.265 or AV1, and wherein the map of maximum pixel block sizes may be used for defining maximum sizes of coding units of the block-based video encoding algorithm.

An advantage associated with the block-based video encoding algorithm being h.265 is that the maximum sizes of coding units of the block-based video encoding algorithm may be set by setting a size of a coding tree unit, CTU, of the block-based video encoding algorithm.

An advantage associated with the block-based video encoding algorithm being AV1 is that the maximum sizes of coding units of the block-based video encoding algorithm may be set by setting a size of a superblock of the block-based video encoding algorithm.

The present embodiment can thus advantageously be employed by standard encoders/decoders.

The method may further comprise: determining a map of minimum pixel block sizes corresponding to the distorted image frames, wherein the map of minimum pixel block sizes comprises areas having different minimum pixel block sizes, and wherein the map of minimum pixel block sizes is determined based on the spatial resolution distribution such that for the first portion of the distorted image frames having the first spatial resolution, the minimum pixel block size corresponding to the first portion is set to a third value being lower than the first value, and for the second portion of the distorted image frames having the second spatial resolution, the minimum pixel block size corresponding to the second portion is set to a fourth value being lower than the second value and the third value; and wherein, in the step of encoding the distorted image frames, the map of minimum pixel block sizes may be used for defining minimum block sizes for encoding blocks of the block-based video encoding algorithm.

An advantage associated with using the map of minimum pixel block sizes for defining minimum block sizes for encoding blocks of the block-based video encoding algorithm according to the present embodiment is that a computational cost, file size and/or a bandwidth associated with video encoding may be reduced and still allowing a homogenous, and therefore improved, visual quality of the encoded video. Specifically, by not allowing a minimum block size of the first portion (having a higher spatial resolution compared to the second portion) to be lower than the minimum block size of the second portion, the encoder can advantageously choose to use a higher compression ratio for the first portion compared to the second portion.

The block-based video encoding algorithm may be h.265, and wherein the map of minimum pixel block sizes may be used for defining the minimum sizes of prediction units, PU, and/or transform units, TU, of the block-based video encoding algorithm.

Advantageously, the present embodiment allows for a low complexity implementation of the minimum block sizes using a standard h.265 encoder/decoder.

The distorted image frames may be produced by capturing by one image sensor through a wide-angle lens, and wherein the spatial resolution distribution may be determined based on a lens polynomial of the wide-angle lens.

Within the context of this application, "lens polynomial" should be construed as a lens-specific polynomial describing that represents the lens refraction for a lens or for an optical dome. The lens polynomial may be acquired by performing measurements, e.g. using an off-axis modular transfer function (MTF) measurement method, on the lens or on the optical dome. A lens or optical dome manufacturer can typically provide the lens polynomial, or a table representing the distortion, for different types of lenses or optical domes in their assortment.

An advantage associated with capturing the distorted image frames by one image sensor through a wide-angle lens is that a wide panoramic of a scene using one image sensor may be allowed and still allow for a homogenous, and therefore improved, visual quality of the encoded video. Consequently, a wide panoramic view with an improved visual quality may be achieved without a need for stitching together image frames captured by separate cameras.

An advantage associated with the spatial resolution distribution being determined based on a lens polynomial of the wide-angle lens is that an easy and less complex determination of the spatial resolution distribution may be allowed.

The wide-angle lens may be a fisheye lens.

An advantage associated with the wide-angle lens being a fisheye lens is that a wide panoramic or hemispherical image frames of a scene using one image sensor may be allowed and still allow for a homogenous, and therefore improved, visual quality of the encoded video. Consequently, a wide panoramic or hemispherical view with an improved visual quality may be achieved without a need for stitching together image frames captured by separate cameras.

The distorted image frames may be produced by capturing by one image sensor through an optical dome, and wherein the spatial resolution distribution may be determined based on a lens polynomial of the optical dome.

An advantage associated with distorted image frames being produced by capturing by one image sensor through an optical dome is that a wide panoramic or hemispherical image frames of a scene using one image sensor may be allowed and still allow for a homogenous, and therefore improved, visual quality of the encoded video. Consequently, a wide panoramic or hemispherical view with an improved visual quality may be achieved without a need for stitching together image frames captured by separate cameras.

An advantage associated with the spatial resolution distribution being determined based on a lens polynomial of the optical dome is that an easy and less complex determination of the spatial resolution distribution may be allowed.

The first and second areas of the map of maximum pixel sizes may form elliptical patterns radially extending from a reference position of the motion detection sensitivity map; and wherein a radial distance between the reference position and the first area may be smaller than a radial distance between the reference position and the second area.

An advantage associated with the first and second areas of the map of maximum pixel sizes forming elliptical patterns radially extending from a reference position of the motion detection sensitivity map is that an easy and less complex determination of the map of maximum pixel sizes may be allowed.

Each distorted image frame may be produced by a stitching, based on a projection algorithm, of a plurality of primary image frames captured by one or more image sensors.

Within the context of this application, "projection algorithm" should be construed as an algorithm that describes how multiple primary image frames are stitched/combined to form a stitched image frame. The projection algorithm may be designed with different purposes, e.g. for providing a smooth transition between the primary image frames or for minimizing distortions in the resulting image frame.

An advantage of producing each distorted image frame by a stitching, based on a projection algorithm, of a plurality of primary image frames captured by one or more image sensors is that a stitched image frame having a larger number of pixels may be allowed.

A further advantage of producing each distorted image frame by a stitching, based on a projection algorithm, of a plurality of primary image frames captured by one or more image sensors is that panoramic image frames without complex optical components, e.g. fisheye lenses or optical domes, may be allowed.

The spatial resolution distribution may be determined based on the projection algorithm.

An associated advantage is that the minimum and/or maximum block sizes for encoding blocks may be defined such that the visual quality of the stitched image frames or panoramic image frames is improved.

A further associated advantage is that it may be an easy and less complex way to determine the spatial resolution distribution, e.g. by using an inverse of the projection algorithm.

According to a second aspect a computer program product is provided. The computer program product comprises a computer-readable medium having computer code instructions stored thereon adapted to carry out the present method when executed by a device having processing capability.

The computer-readable medium may be a non-transitory computer-readable medium.

The above-mentioned features of the method, when applicable, apply to this second aspect as well. To avoid undue repetition, reference is made to the above.

According to a third aspect an encoder for encoding, using a block-based video encoding algorithm, distorted image frames produced via at least one image sensor is provided. The encoder comprises: a spatial resolution distribution component adapted to determine a spatial resolution distribution for the distorted image frames; a maximum pixel block sizes map component adapted to determine a map of maximum pixel block sizes corresponding to the distorted image frames, wherein the map of maximum pixel block sizes is determined based on the spatial resolution distribution such that for a first portion of the distorted image frames having a first spatial resolution, the maximum pixel block size corresponding to the first portion is set to a first value, and for a second portion for the distorted image frames having a second spatial resolution being lower than the first spatial resolution, the maximum pixel block size corresponding to the second portion is set to a second value being lower than the first value; and a video encoding component adapted to encode, using the block-based video encoding algorithm, the distorted image frames, wherein the map of maximum pixel block sizes is used by the block-based video encoding algorithm for defining maximum block sizes for encoding blocks of the block-based video encoding algorithm.

The above-mentioned features of the method and the computer program product, when applicable, apply to this third aspect as well. To avoid undue repetition, reference is made to the above.

The encoder may further comprise: a minimum pixel block sizes map component adapted to determine a map of minimum pixel block sizes corresponding to the distorted image frames, the map of minimum pixel block sizes comprising areas having different minimum pixel block sizes, and wherein the map of minimum pixel block sizes is determined based on the spatial resolution distribution such that for the first portion of the distorted image frames having the first spatial resolution, the minimum pixel block size corresponding to the first portion is set to a third value being lower than the first value, and for the second portion of the distorted image frames having the second spatial resolution, the minimum pixel block size corresponding to the second portion is set to a fourth value being lower than the second value and the third value; and wherein the map of minimum pixel block sizes may be used by the block-based video encoding algorithm for defining minimum block sizes for encoding blocks of the block-based video encoding algorithm.

According to a fourth aspect a camera is provided. The camera comprises the encoder according to the third aspect.

The above-mentioned features of the method, the computer program product, and the encoder, when applicable, apply to this fourth aspect as well. To avoid undue repetition, reference is made to the above.

The camera may further comprise a wide-angle lens through which images are captured by one image sensor of the camera.

The camera may further comprise a plurality of image sensors, and wherein the encoder further comprises a stitching component adapted to stitch image frames from a plurality of primary images captured by the plurality of image sensors.

A further scope of applicability of the present disclosure will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular steps of the methods described or component parts of the systems described as such method and system may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings do not exclude other elements or steps.

BRIEF DESCRIPTION OF THE DRAWINGS

The above and other aspects of the present inventive concept will now be described in more detail, with reference to appended drawings showing variants of the inventive concept. The figures should not be considered limiting the invention to the specific variants; instead they are used for explaining and understanding the inventive concept.

As illustrated in the figures, the sizes of layers and regions are exaggerated for illustrative purposes and, thus, are provided to illustrate the general structures of embodiments of the present invention. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

Figure 1A:
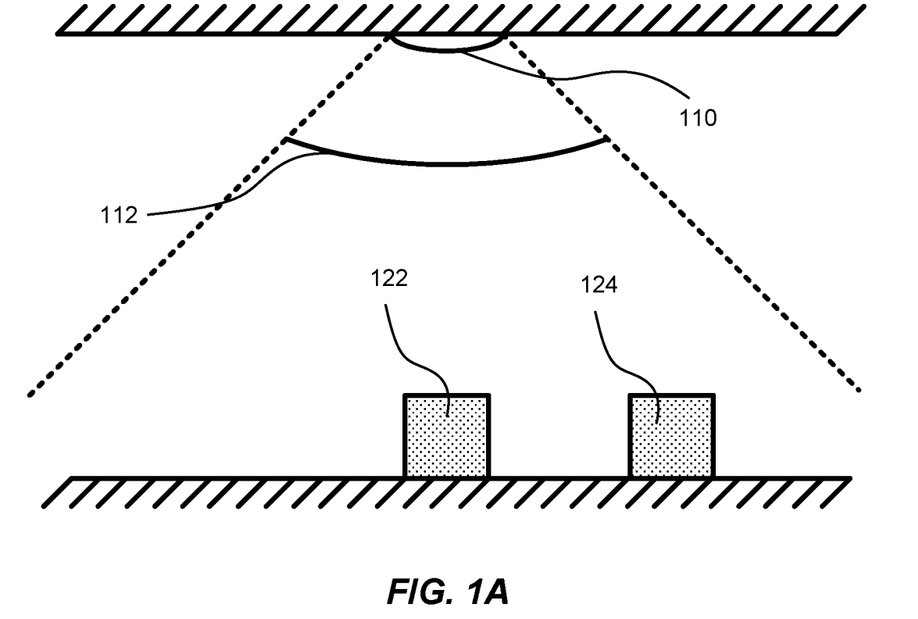
FIG. 1A illustrates a side view of a scene monitored from above by a monitoring camera.

FIG. 1A illustrates a side view of a scene monitored from above by a camera 110. The scene comprises a first box 122, and a second box 124 having similar sizes. The camera 110 comprises at least one image sensor arranged to produce distorted image frames of the scene. The camera 110 in FIG. 1A may be the camera 210 described in relation to FIG. 2B or the camera 410 described in relation to FIG. 2C. An example of a distorted image frame 140 of the scene illustrated in FIG. 1A will be described in relation to FIG. 1C. The camera 110 has a wide field of view 112. The wide field of view 112 may be up to 180°. An associated solid angle of the wide field of view 112 may be up to $2\pi$ sr.

Figures 1B, 1C:
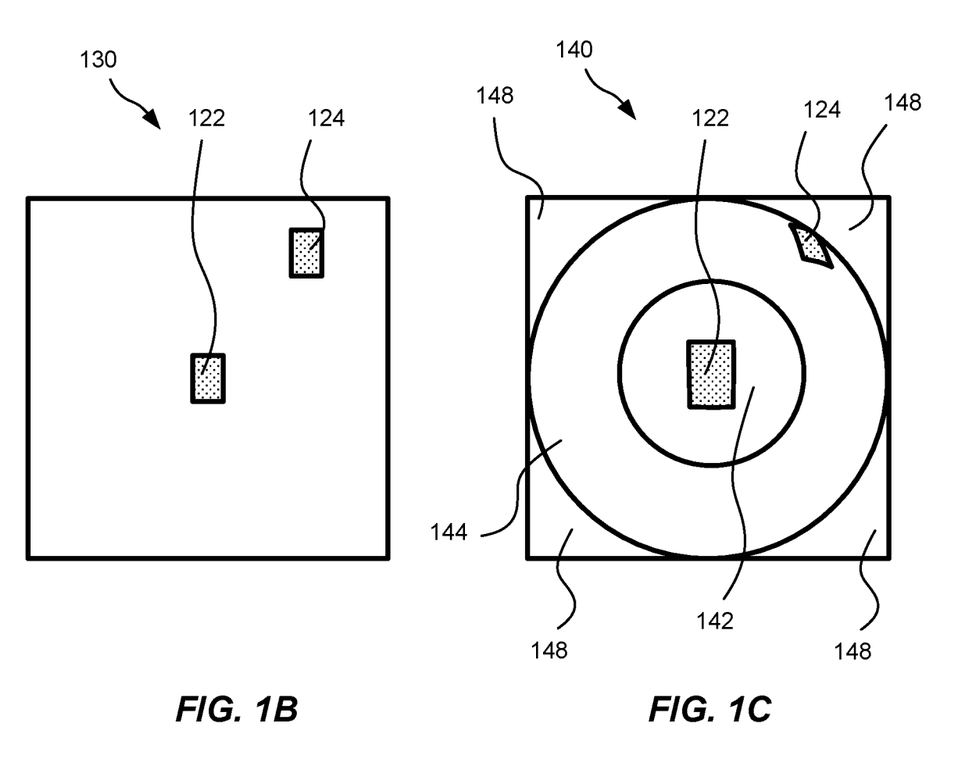
FIG. 1B illustrates a top view of the scene monitored in FIG. 1A.
FIG. 1C illustrates a non-rectilinear image frame of the top view in FIG. 1B.

FIG. 1B illustrates a rectilinear image frame 130 of a top view of the scene monitored in FIG. 1A. As is seen in FIG. 1B, each of the boxes 122, 124 have similar sizes when seen from above in the rectilinear image frame 130. Thus, a spatial resolution in the rectilinear image frame 130 in FIG. 1B is substantially constant over the rectilinear image frame 130.

FIG. 1C illustrates a distorted image frame 140 of the top view in FIG. 1B. The distorted image frame 140 may be produced by capturing by one image sensor through a wide-angle lens. The distorted image frame 140 may be produced by capturing by one image sensor through an optical dome. The distorted image frame 140 may be produced by stitching, based on a projection algorithm, a plurality of primary images, as will be described in relation to FIG. 2C. As is seen in FIG. 1C, the apparent sizes of the boxes 122, 124 varies depending on the position of each box 122, 124 in the distorted image frame 140. Thus, a spatial resolution in the distorted image frame 140 varies over the distorted image frame 140. The spatial distribution may be determined based on the distorted image frame 140 and the rectilinear image frame 130. The spatial distribution may be determined based on the wide-angle lens of the camera 110. The distorted image frame 140 may be produced by capturing by one image sensor through a wide-angle lens, and wherein the spatial resolution distribution is determined based on a lens polynomial of the wide-angle lens. In case the distorted image frame 140 is produced by a stitching, based on a projection algorithm, a plurality of primary images, the spatial distribution may be based on the projection algorithm. For instance, the spatial distribution may be based on an inverse of the projection algorithm.

In FIG. 1C, the first box 122 is within a first portion 142 of the distorted image frame 140. The first portion 142 of the distorted image frame 140 is associated with a first spatial resolution. The second box 124 is within a second portion 144 of the distorted image frame 140. The second portion 142 of the distorted image frame 140 is associated with a second spatial resolution. The distorted image frame 140 may also comprise portions 148 without information related to the monitored scene due to the imaging optics and/or projection algorithm used when producing the distorted image frame 140. The first spatial resolution and the second spatial resolution are related such that objects (e.g. the boxes 122, 124) of equal sizes appear larger in the first portion 142 of the distorted image 140 than in the second portion 144 of the distorted image 140, as exemplified in FIG. 2C. In other words, expressing the spatial resolution in terms of field of view angle per pixel, the spatial resolution in the first portion 142 is higher than the spatial resolution in the second portion 144.

Figure 2A:
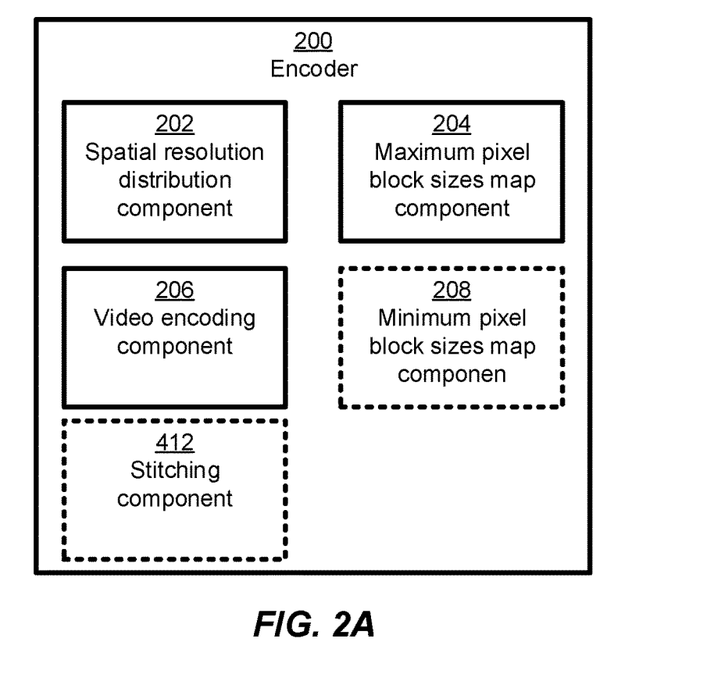
FIG. 2A illustrates an encoder for encoding, using a block-based encoding algorithm, distorted image frames produced via at least one image sensor.
Figure 2B:
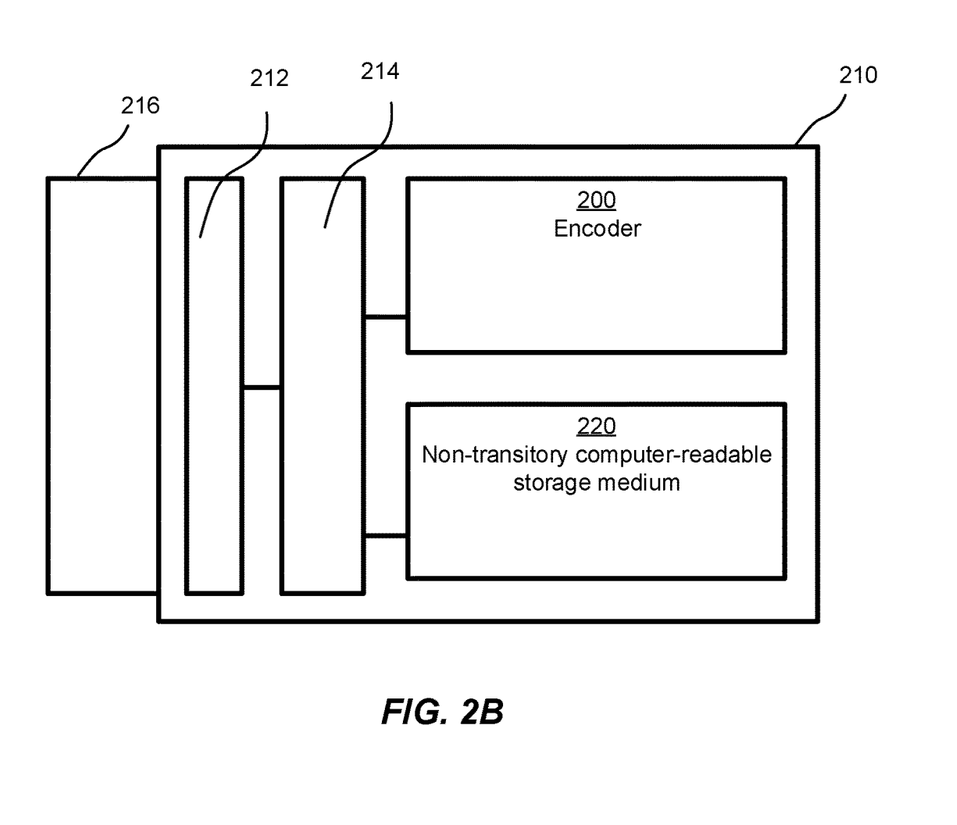
FIG. 2B illustrates a camera comprising the encoder of FIG. 2A.
Figure 2C:
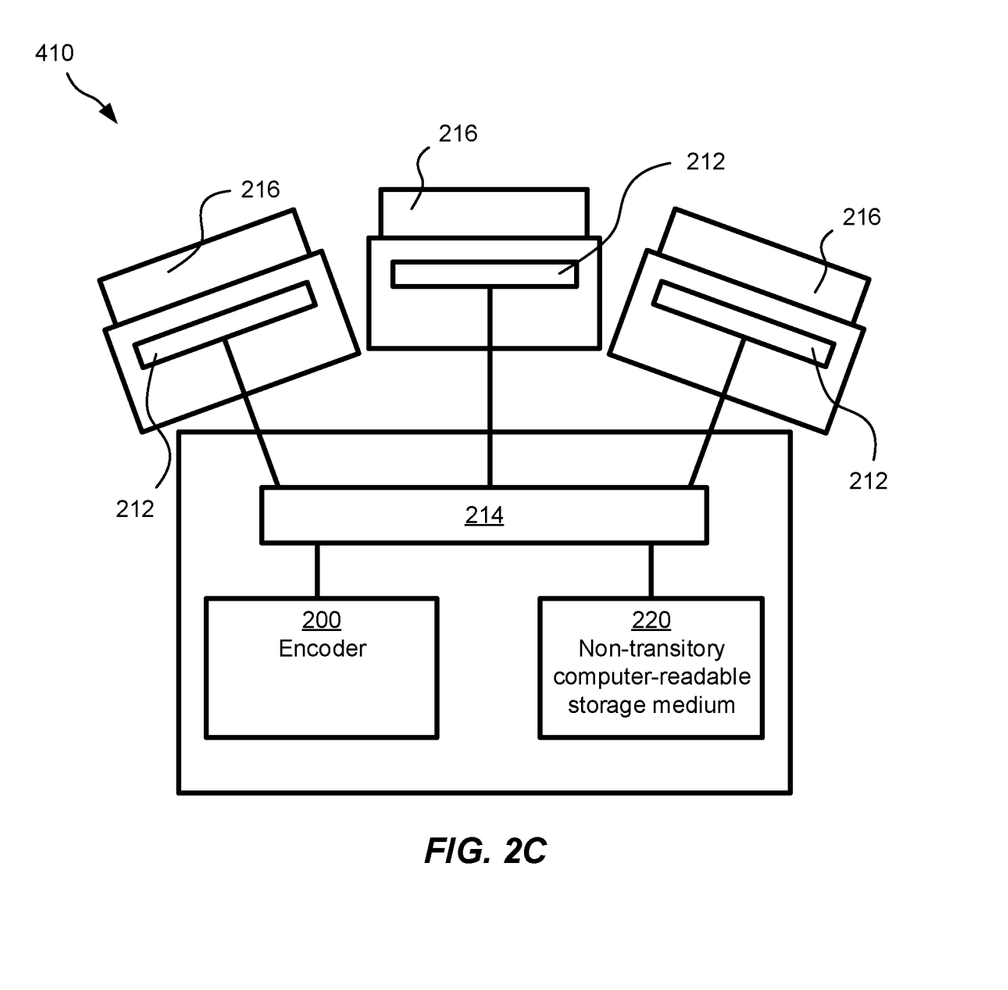
FIG. 2C illustrates a camera comprising a plurality of image sensors.

In case the distorted image frame 140 illustrated in FIG. 2C is encoded using the same block size for encoding blocks of a block-based video encoding algorithm, objects in the second portion 144 (e.g. the second box 124) will be encoded using fewer encoding blocks than objects in the first portion 142, since the objects in the second portion 144 appear as smaller than the objects in the first portion 142. To this end, decreasing a maximum pixel block size for encoding blocks corresponding to the second portion 144 may increase the number of encoding blocks for encoding the objects (e.g. the second box 124) in the second portion 144. A visual quality of objects in the second portion 144 in the encoded distorted video frame will thereby be increased as discussed above.

In the prior art, the block-based video encoding algorithm is usually instructed to choose pixel block sizes for encoding blocks based on a content of the distorted image frame. The block-based video encoding algorithm typically determines that contents in portions having a low spatial resolution (e.g. in the second portion 144 of the distorted image frame 140) is less important than contents in portions having a high spatial resolution (e.g. in the first portion 142 of the distorted image frame 140). Thus, a prior art encoder typically chooses a larger pixel block size for encoding blocks for portions having a lower spatial resolution (e.g. the second portion 144) than for portions having a higher spatial resolution (e.g. the first portion 142). Therefore, the block-based video encoding algorithm encodes distorted image frames such that the visual quality in portions of the distorted image having a low spatial resolution is reduced.

Figure 1D:
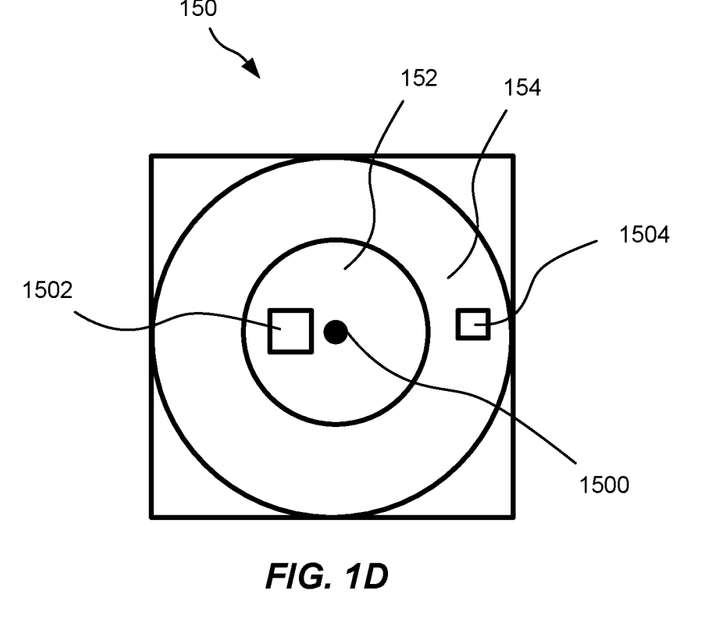
FIG. 1D illustrates a map of maximum pixel block sizes.

To this end, to account for the varying spatial distribution over the distorted image frame 140, a map of maximum pixel block sizes 150 is determined based on the spatial resolution distribution, such that for the first portion 142 of the distorted image frame 140 having the first spatial resolution, the maximum pixel block size is set to a first value 1502, and for the second portion 144 of the distorted image frame 140 having the second spatial resolution being lower than the first spatial resolution, the maximum pixel block size corresponding to the second portion 144 is set to a second value 1504 being lower than the first value 1502. An example of a map of maximum pixel block sizes 150 is illustrated in FIG. 1D. The distorted image frame 140 is encoded, using the block-based video encoding algorithm, wherein the map of maximum pixel block sizes 150 is used for defining maximum pixel block sizes for encoding blocks of the block-based video encoding algorithm. The map of maximum pixel block sizes 150 may be used for defining maximum sizes of coding units for the block-based video encoding algorithm. For instance, in case the block-based video encoding algorithm is h.265, the coding tree unit, CTU, size may set the maximum size of coding units. In case the block-based video encoding algorithm is AV1, the size of a superblock may set the maximum size of coding units.

The block-based video encoding algorithm may use a smaller pixel block size for encoding blocks than the maximum pixel block size. The block-based video encoding algorithm typically uses a smaller pixel block size for encoding blocks than the maximum pixel block size in case the block-based video encoding algorithm determines that it is beneficial to the visual quality of the encoded video. Thus, objects in the first portion 142 of the distorted image frame 140 may be encoded using a large number of encoding blocks, thereby resulting in an encoded video having a high bitrate. In order to reduce the bitrate, a minimum pixel block size for encoding blocks associated with encoding the first portion 142 of the distorted image frame 140 may be set. Thus, the visual quality of objects in the first portion 142 will thereby be decreased in order to reduce the bitrate of the encoded video. In case the block-based video encoding algorithm is h.265, the minimum pixel block size for encoding blocks may be set by defining the minimum sizes of prediction units, PU, and/or transform units, TU, of the block-based video encoding algorithm.

Figure 1E:
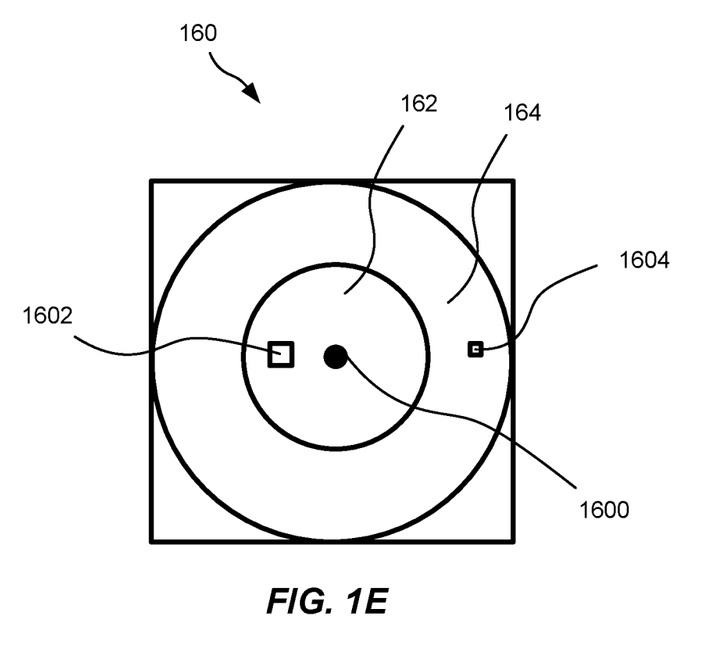
FIG. 1E illustrates a map of minimum pixel block sizes.

To this end, a map of minimum pixel block sizes 160 corresponding to the distorted image frame 140 may be determined. An example of a map of maximum pixel block sizes 160 is illustrated in FIG. 1E. The map of minimum pixel block sizes 160 may comprise areas 162, 164 having different minimum pixel block sizes, and wherein the map of minimum pixel block sizes 160 is determined based on the spatial resolution distribution such that for the first portion 142 of the distorted image frame 140 having the first spatial resolution, the minimum pixel block size corresponding to the first portion 142 is set to a third value 1602 being lower than the first value 1502, and for the second portion 144 of the distorted image frame 140 having the second spatial resolution, the minimum pixel block size corresponding to the second portion 144 is set to a fourth value 1604 being lower than the second value 1504 and the third value 1602. The distorted image frame 140 may be encoded further using the map of minimum pixel block sizes 160 for defining minimum block sizes for encoding blocks of the block-based video encoding algorithm. Using the map of minimum pixel block sizes 160 for defining minimum block sizes for encoding blocks of the block-based video encoding algorithm may reduce a computational cost, file size and/or bandwidth associated with video encoding, and still allow a homogenous, and therefore improved, visual quality of the encoded video. Specifically, by not allowing a minimum block size of the first portion 142 (having a higher spatial resolution compared to the second portion 144) to be lower than the minimum block size of the second portion 144, the block-based video encoding algorithm may advantageously choose to use a higher compression ratio for the first portion 142 compared to the second portion 144.

As exemplified in FIG. 1C, the first portion 142 and the second portion 144 in the distorted image frame 140 may form elliptical patterns radially extending from a reference position of the distorted image frame 140. The reference position may be a central position of the distorted image frame 140, as exemplified in FIG. 1C, and a radial distance from the reference position to the first portion 142 is smaller than a radial distance from the reference position to the second portion 144. Thus, a first area 152 of the map of maximum pixel sizes 150 corresponding to the first portion 142 of the distorted image frame 140 and a second area 154 of the map of maximum pixel sizes 150 corresponding to the second portion 144 of the distorted image frame 140 may form elliptical patterns radially extending from a reference position 1500 of the map of maximum pixel sizes 150. A radial distance between the reference position 1500 and the first area 152 may be smaller than a radial distance between the reference position 1500 and the second area 154.

Further, a first area 162 of the map of minimum pixel sizes 160 corresponding to the first portion 142 of the distorted image frame 140 and a second area 164 of the map of minimum pixel sizes 150 corresponding to the second portion 144 of the distorted image frame 140 may form elliptical patterns radially extending from a reference position 1600 of the map of minimum pixel sizes 160. A radial distance between the reference position 1600 and the first area 162 may be smaller than a radial distance between the reference position 1600 and the second area 164. The reference position 1600 in the map of minimum pixel block sizes 160 may correspond to the reference position 1500 in the map of maximum pixel block sizes 150.

It is to be understood that the spatial resolution distribution of the distorted image frame 140 may vary continuously over the distorted image frame 140, and that the corresponding map of maximum pixel block sizes 150 may vary accordingly. Thus, the description in relation to FIGS. 1A-1E relates to a first portion 142 and a second portion 144, but may equally well relate to a larger number of portions. A skilled person realizes how to adapt the above description to account for additional portions in the distorted image frame 140 and/or a continuously varying spatial resolution distribution over the distorted image frame 140.

FIG. 2A illustrates an encoder 200. The encoder 200 is configured for encoding, using a block-based encoding algorithm, distorted image frames produced via at least one image sensor. The encoder 200 may be hardware and/or software implemented.

The encoder 200 comprises a spatial resolution component 202 adapted to determine a spatial resolution distribution for the distorted image frames. The spatial resolution may be determined based on a lens polynomial of imaging optics used when capturing the distorted image frames 410. The imaging optics may be a wide-angle lens, e.g. a fisheye lens, or an optical dome.

The encoder 200 further comprises a maximum pixel block sizes map component 204 adapted to determine a map of maximum pixel block sizes corresponding to the distorted image frames, wherein the map of maximum pixel block sizes is determined based on the spatial resolution distribution such that for a first portion of the distorted image frames having a first spatial resolution, the maximum pixel block size corresponding to the first portion is set to a first value, and for a second portion for the distorted image frames having a second spatial resolution being lower than the first spatial resolution, the maximum pixel block size corresponding to the second portion is set to a second value being lower than the first value.

The encoder 200 further comprises a video encoding component 206 adapted to encode, using the block-based video encoding algorithm, the distorted image frames, wherein the map of maximum pixel block sizes is used by the block-based video encoding algorithm for defining maximum block sizes for encoding blocks of the block-based video encoding algorithm. The map of maximum pixel block sizes may be used for defining maximum block sizes of coding units of the block-based video encoding algorithm. In case the block-based encoding algorithm is h.265, the coding tree unit, CTU, size may define the maximum block sizes of the coding units. In case the block-based encoding algorithm is AV1, the size of superblocks may define the maximum size of the coding units.

As exemplified in FIG. 2A, the encoder 200 may further comprise a minimum pixel block sizes map component 208 adapted to determine a map of minimum pixel block sizes corresponding to the distorted image frames, the map of minimum pixel block sizes comprising areas having different minimum pixel block sizes, and wherein the map of minimum pixel block sizes is determined based on the spatial resolution distribution such that for the first portion of the distorted image frames having the first spatial resolution, the minimum pixel block size corresponding to the first portion is set to a third value being lower than the first value, and for the second portion of the distorted image frames having the second spatial resolution, the minimum pixel block size corresponding to the second portion is set to a fourth value being lower than the second value and the third value; and wherein the map of minimum pixel block sizes may be used by the block-based video encoding algorithm for defining minimum block sizes for encoding blocks of the block-based video encoding algorithm.

In case the block-based encoding algorithm is h.265, the minimum block sizes of coding units may be defined by the minimum sizes of prediction units, PU, and/or transform units, TU, of the block-based video encoding algorithm.

The encoder 200 may further comprise a stitching component 412 adapted to stitch image frames from a plurality of primary images, thereby producing the distorted image frames. In other embodiments, the stitching component is separate from the encoder 200, wherein the distorted image frame comprises a plurality of captured images being stitched together before being received at the encoder 200.

The encoder 200 may be comprised in a camera 210, as exemplified in FIG. 2B. The camera 210 further comprises at least one image sensor 212. The at least one image sensor 212 and the encoder 200 may communicate via a data bus 214. The camera 212 may further comprise imaging optics 216 through which images are captured by the at least one image sensor 212 of the camera 210. The imaging optics 214 may be a wide-angle lens. The wide-angle lens may be a fisheye lens. The wide-angle lens may be an optical dome.

As exemplified in FIG. 2C, the camera 410 may comprise a plurality of image sensors 212. The camera 410 may comprise a stitching component 412 (not shown in FIG. 2C since it is included in the encoder 200) adapted to stitch image frames from a plurality of primary images captured by the plurality of image sensors 212. Each of the plurality of image sensors 212 may, as exemplified in FIG. 2C, be associated with imaging optics 216. The imaging optics 216 may be similar to the imaging optics as described in relation to FIG. 2B. The imaging optics 216 in FIG. 2C may be traditional camera objectives adapted to reduce distortions in the primary images, i.e. the camera objective may be adapted to produce substantially rectilinear images as primary images. The plurality of image sensors 212 and the encoder 200 may communicate via a data bus 214.

The camera 210, 410 may further comprise a non-transitory computer-readable storage medium 220 configured to store settings of the encoder, the map of maximum pixel block sizes, the map of minimum pixel block sizes, the distorted image frames, and/or the encoded video. The at least one image sensor 212, the encoder 220, and the non-transitory computer-readable storage medium 220 may communicate via the data bus 214.

It is to be understood that the encoder 200 may be comprised in an external computer and/or server configured to receive distorted image frames from the camera 210, 410.

Figure 3:
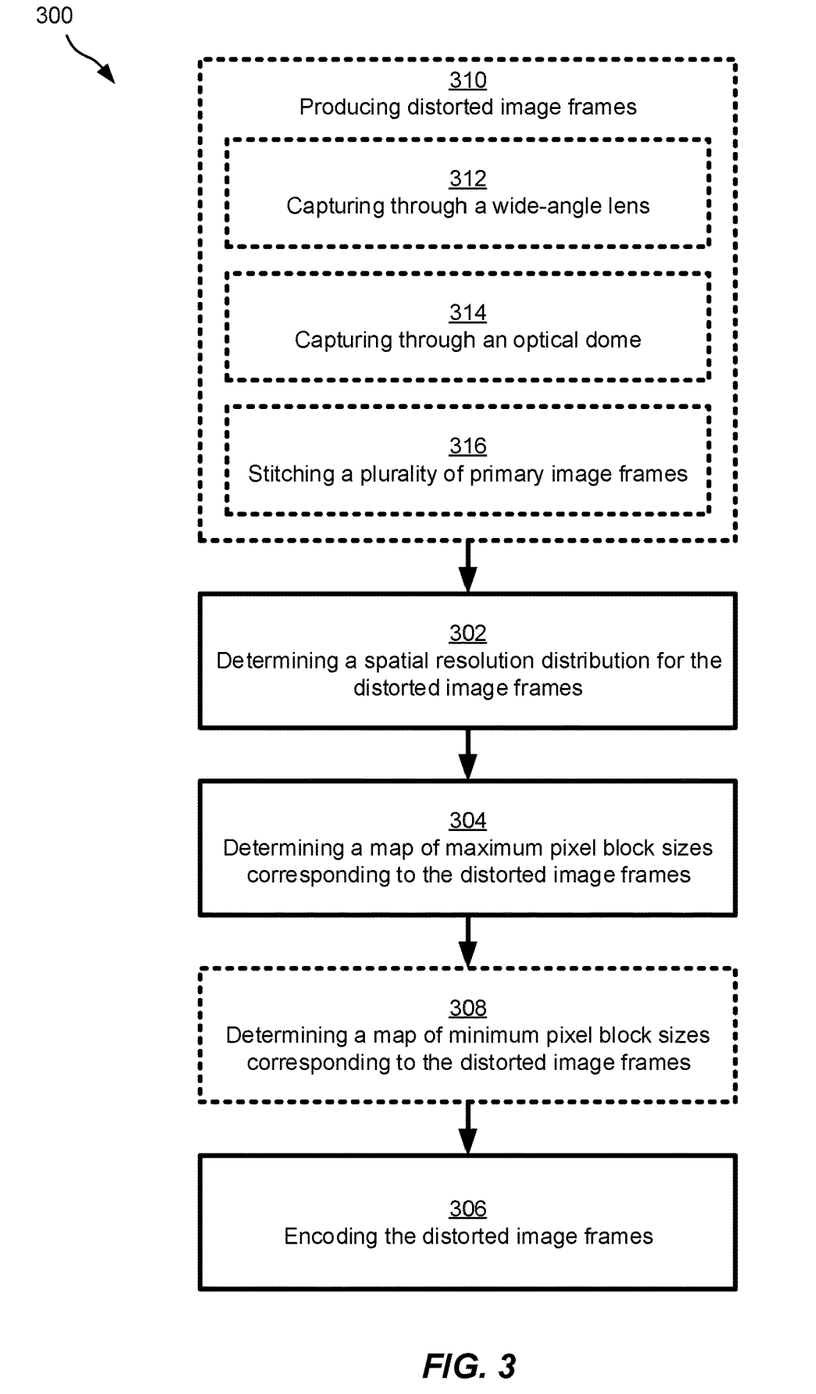
FIG. 3 is a block scheme of a method for encoding, using a block-based video encoding algorithm, distorted image frames produced via at least one image sensor.

FIG. 3 is a block scheme of a method 300 for encoding, using a block-based video encoding algorithm, distorted image frames 140 produced via at least one image sensor 212.

The method 300 comprises determining 302 a spatial resolution distribution for the distorted image frames 140.

The distorted image frames 140 may be produced by capturing 312 by one image sensor 212 through a wide-angle lens, and the spatial resolution distribution may be determined based on a lens polynomial of the wide-angle lens.

The wide-angle lens may be a fisheye lens.

The distorted image frames 140 may be produced by capturing 314 by one image sensor 212 through an optical dome, and the spatial resolution distribution may be determined based on a lens polynomial of the optical dome.

Each distorted image frame 140 may be produced by a stitching 316, based on a projection algorithm, of a plurality of primary image frames captured by one or more image sensors 212.

The spatial resolution distribution may be determined based on the projection algorithm.

The method further comprises determining 304 a map of maximum pixel block sizes 150 corresponding to the distorted image frames 140. The map of maximum pixel block sizes 150 is determined based on the spatial resolution distribution such that for a first portion 142 of the distorted image frames 140 having a first spatial resolution, the maximum pixel block size corresponding to the first portion 142 is set to a first value 1502, and for a second portion 144 of the distorted image frames 140 having a second spatial resolution being lower than the first spatial resolution, the maximum pixel block size corresponding to the second portion 144 is set to a second value 1504 being lower than the first value 1502.

The map of maximum pixel block sizes 150 may comprise areas having different maximum pixel block sizes.

The first portion 142 may be a central portion of the distorted image frames 140.

The second portion 144 may be an outer portion of the distorted image frames 140.

The method 300 further comprises encoding 306, using the block-based video encoding algorithm, the distorted image frames 140, wherein the map of maximum pixel block sizes 150 is used for defining maximum block sizes for encoding blocks of the block-based video encoding algorithm.

The block-based video encoding algorithm may be h.265 or AV1, and the map of maximum pixel block sizes 150 may be used for defining maximum sizes of coding units of the block-based video encoding algorithm.

The method 300 may further comprise determining 308 a map of minimum pixel block sizes 160 corresponding to the distorted image frames 140, wherein the map of minimum pixel block sizes 160 comprises areas 162, 164 having different minimum pixel block sizes, and wherein the map of minimum pixel block sizes 160 is determined based on the spatial resolution distribution such that for the first portion 142 of the distorted image frames 140 having the first spatial resolution, the minimum pixel block size corresponding to the first portion 142 is set to a third value 1602 being lower than the first value 1502, and for a second portion 144 of the distorted image frames 140 having the second spatial resolution, the minimum pixel block size corresponding to the second portion 144 is set to a fourth value 1604 being lower than the second value 1504 and the third value 1602; and wherein, in the step of encoding 306 the distorted image frames 140, the map of minimum pixel block sizes 160 is used for defining minimum block sizes for encoding blocks of the block-based video encoding algorithm.

The block-based video encoding algorithm may be h.265, and the map of minimum pixel block sizes 160 may be used for defining the minimum sizes of prediction units, PU, and/or transform units, TU, of the block-based video encoding algorithm.

A first area 152 of the map of maximum pixel sizes 150 corresponding to the first portion 142 of the distorted image frame 140 and a second area 154 of the map of maximum pixel sizes 150 corresponding to the second portion 144 of the distorted image frame 140 may form elliptical patterns radially extending from a reference position 1500 of the map of maximum pixel sizes 150, and a radial distance between the reference position 1500 and the first area 152 may be smaller than a radial distance between the reference position 1500 and the second area 154.

The method 300 have above been described and shown in FIG. 3 in a sequential manner, however the steps of the method 300 may be performed in other orders than described here. For instance, the map of minimum pixel block sizes 160 may be determined prior to, or simultaneously with, the map of maximum pixel block sizes 150.

The person skilled in the art realizes that the present inventive concept by no means is limited to the preferred variants described above. On the contrary, many modifications and variations are possible within the scope of the appended claims.

For example, the distorted image frame 140 discussed in relation to FIG. 1C may alternatively be produced by a stitching, based on a projection algorithm, of a plurality of primary image frames captured by one or more image sensors. The spatial resolution distribution may, for a stitched image, be based on the projection algorithm.

As a further example, in FIG. 1D and FIG. 1E, the third value 1602 is shown as being smaller than the second value 1504, however, it is to be understood that the second value 1504 may be smaller than the third value 1602.

Additionally, variations to the disclosed variants can be understood and effected by the skilled person in practicing the claimed invention, from a study of the drawings, the disclosure, and the appended claims.

The invention claimed is:

1. A method for encoding, using a block-based video encoding algorithm, a distorted image frame produced via at least one image sensor, depicting a scene, each pixel in the distorted image frame corresponding to a field of view, FOV, in the scene, the method comprising:
    determining a map of maximum pixel block sizes corresponding to the distorted image frame, wherein the map of maximum pixel block sizes is determined based on a spatial resolution distribution corresponding to a distribution of extents of the corresponding FOV per pixel in the distorted image frame, such that for a first portion of the distorted image frame having a first spatial resolution, the maximum pixel block size corresponding to the first portion is set to a first value, and for a second portion of the distorted image frame having a second spatial resolution being lower than the first spatial resolution, the maximum pixel block size corresponding to the second portion is set to a second value being lower than the first value; and
    encoding, using the block-based video encoding algorithm, the distorted image frame, wherein the map of maximum pixel block sizes is used for defining maximum block sizes for encoding blocks of the block-based video encoding algorithm.

2. The method according to claim 1, wherein the block-based video encoding algorithm is h.265 or AV1, and wherein the map of maximum pixel block sizes is used for defining maximum sizes of coding units of the block-based video encoding algorithm.

3. The method according to claim 1, further comprising:
    determining a map of mum pixel block sizes corresponding to the distorted image frame, wherein the map of minimum pixel block sizes comprises areas having different minimum pixel block sizes, and wherein the map of minimum pixel block sizes is determined based on the spatial resolution distribution such that for the first portion of the distorted image frame having the first spatial resolution, the minimum pixel block size corresponding to the first portion is set to a third value being lower than the first value, and for the second portion of the distorted image frame having the second spatial resolution, the minimum pixel block size corresponding to the second portion is set to a fourth value being lower than the second value and the third value; and
    wherein, in the step of encoding the distorted image frame, the map of minimum pixel block sizes is used for defining minimum block sizes for encoding blocks of the block-based video encoding algorithm.

4. The method according to claim 3, wherein the block-based video encoding algorithm is h.265, and wherein the map of minimum pixel block sizes is used for defining the minimum sizes of prediction units, PU, and/or transform units, TU, of the block-based video encoding algorithm.

5. The method according to claim 1, wherein the distorted image frame are produced by capturing by one image sensor through a wide-angle lens.

6. The method according to claim 5, wherein the wide-angle lens is a fisheye lens.

7. The method according to claim 1, wherein the distorted image frame are produced by capturing by one image sensor through an optical dome.

8. The method according to claim 1, wherein each distorted image frame is produced by a stitching, based on a projection algorithm, of a plurality of primary image frames captured by one or more image sensors.

9. The method according to claim 5, wherein a first area of the map of maximum pixel sizes corresponding to the first portion of the distorted image frame and a second area of the map of maximum pixel sizes corresponding to the second portion of the distorted image frame form elliptical patterns radially extending from a reference position of the map of maximum pixel sizes; and
    wherein a radial distance between the reference position and the first area is smaller than a radial distance between the reference position and the second area.

10. A non-transitory computer-readable medium including instructions that, when executed by circuitry on a device, cause the circuitry to perform the method according to claim 1.

11. An encoder for encoding, using a block-based video encoding algorithm, distorted image frame produced via at least one image sensor, depicting a scene, each pixel in the distorted image frame corresponding to a field of view, FOV, of the scene, the encoder being configured to:

determine a map of maximum pixel block sizes corresponding to the distorted image frame, wherein the map of maximum pixel block sizes is determined based on a spatial resolution distribution corresponding to a distribution of extents of the corresponding FOY per pixel in the distorted image frame, such that for a first portion of the distorted image frame having a first spatial resolution, the maximum pixel block size corresponding to the first portion is set to a first value, and for a second portion for the distorted image frame having a second spatial resolution being lower than the first spatial resolution, the maximum pixel block size corresponding to the second portion is set to a second value being lower than the first value; and encode, using the block-based video encoding algorithm, the distorted image frame, wherein the map of maximum pixel block sizes is used by the block-based video encoding algorithm for defining maximum block sizes for encoding blocks of the block-based video encoding algorithm.

12. A camera comprising the encoder according to claim 11.

13. The camera according to claim 12, further comprising a wide-angle lens through which images are captured by one image sensor of the camera.

14. The camera according to claim 12, further comprising a plurality of image sensors, and wherein the encoder is further configured to stitch image frame from a plurality of primary images captured by the plurality of image sensors.

\* \* \* \* \*